May 12, 1931. J. P. MORLEY 1,805,222
WATER HEATER
Filed July 16, 1928
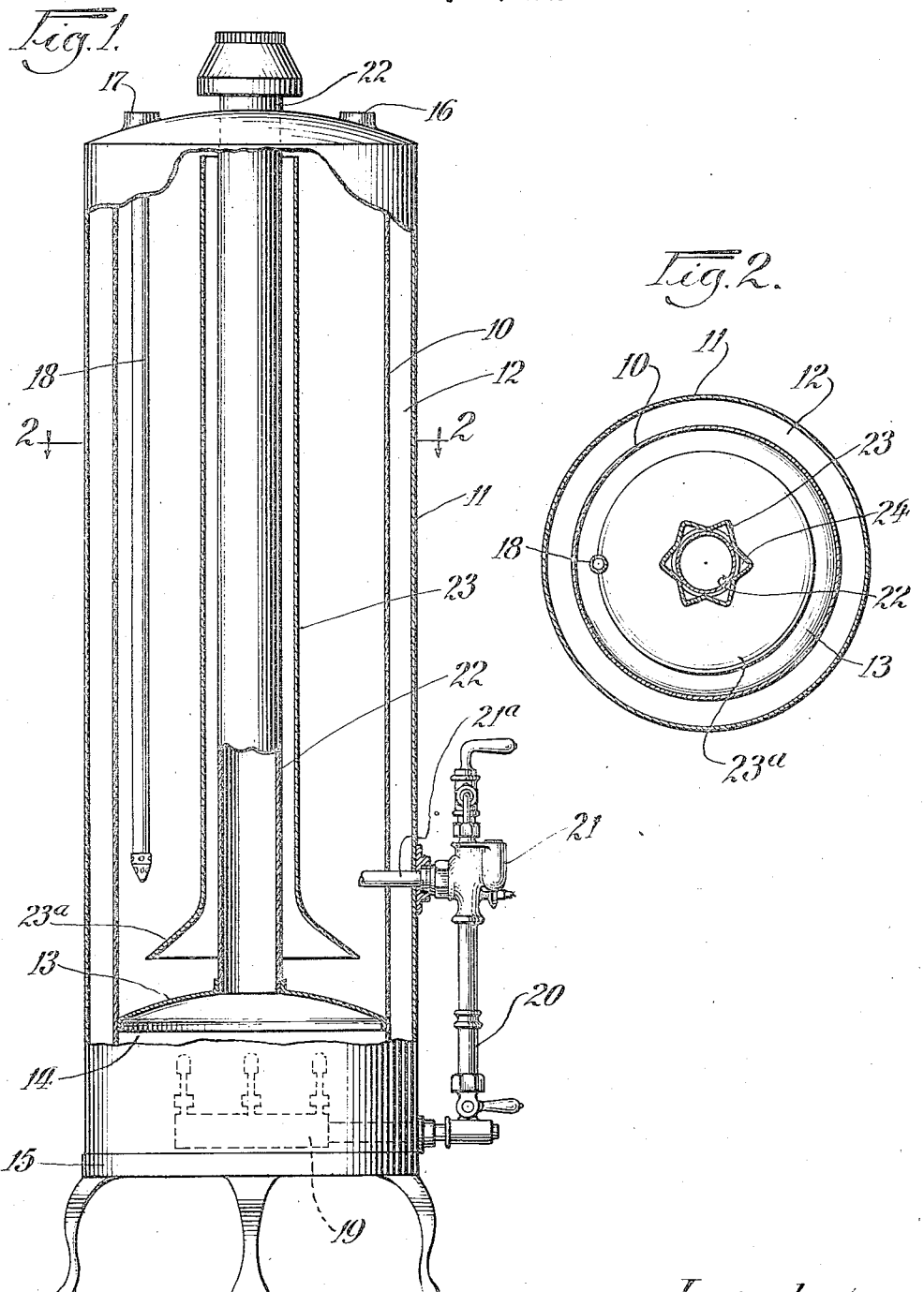

Patented May 12, 1931

1,805,222

UNITED STATES PATENT OFFICE

JAMES P. MORLEY, OF MICHIGAN CITY, INDIANA, ASSIGNOR TO BASTIAN-MORLEY COMPANY, OF LA PORTE, INDIANA, A CORPORATION OF INDIANA

WATER HEATER

Application filed July 16, 1928. Serial No. 293,112.

My invention relates primarily to water heaters including a storage tank associated with a combustion chamber in which heating means is located and from which a flue structure leads through the storage tank, and it has to do more especially with novel thermosiphonic means cooperating with the heating means for heating and circulating the water within the storage tank.

One of the objects of my invention is to provide simple and inexpensive means of the foregoing character which is adapted to be mounted wholly within the storage tank and which is capable of effecting a very rapid water-heating and water-circulating action.

Another object is to provide thermosiphonic means which may be associated with the flue structure passing through the water in the storage tank whereby the flue gases may be effectively utilized in heating and circulating the water with the result that fuel consumption is reduced to a minimum and operating costs generally are reduced with an increase in heater efficiency.

A further and more specific object is to provide what I may term a "multiple riser" element having a plurality of riser tubes of small cross-sectional area, each of which tubes is formed in part by a wall surface of the flue structure (or other hot gas conduit) so that the water passing through these riser tubes passes directly along and in contact with the flue or other conduit wall which is heated by the hot gases of combustion passing therethrough.

Another object is to provide a water heater in which the hot gases from a suitable burner are applied directly against the tank wall to initially heat the water at that point and to initiate a circulatory action, and in which some of the hot gases are also directed through the body of the water in the storage tank along the water-circulation path to continuously stimulate and increase the circulatory action.

Additional objects are to provide positive directional means for causing the initially heated water at the bottom of the storage tank, as it circulates upwardly, to enter the multiple-tube riser element for the circulatory movement; to provide a heater including the foregoing features which is automatic in operation; and to provide a water-heating and circulating arrangement of such character that the water is brought quickly to and maintained at the desired temperature.

Other objects and advantages will become apparent as this description progresses and by reference to the drawing wherein;

Figure 1 is a front partially-sectional view of one form of heater structure embodying my invention; and Fig. 2 is a horizontal section taken substantially on line 2—2 of Fig. 1.

The form of heater which I have chosen to illustrate my invention includes a storage tank 10 surrounded by a shell 11. The tank and shell are spaced apart to provide an insulating space 12 which may take the form of a dead air space or it may receive any desired form of insulating material for suitably insulating the tank 10. The walls of the storage tank and shell are extended downwardly beneath the tank bottom 13 to provide a combustion chamber 14. The above structure is firmly mounted upon a leg-supported base 15 which forms the bottom of the combustion chamber. The top of the tank takes preferably the form shown in Fig. 1, and is provided with a service connection 16 and a cold water supply connection 17 from which extends the usual supply pipe 18.

The combustion chamber 14 is comparatively shallow and receives a gas burner 19. This burner is of a character adapted to discharge hot gases of combustion against the dome-shaped tank bottom 13 in a uniformly distributed manner and without the burner flames impinging the tank bottom. The burner may be supported in the combustion chamber in any desired manner and the fuel (which in this instance is gas) to be burned thereby is supplied through a pipe 20. The flow of fuel through this supply pipe is controlled by a thermostat 21 which may be of a slow-action, snap-action, or other, type. This thermostat has the usual thermal element 21ª projecting into the tank and it functions under the control of the temperature of the water in the tank to increase and decrease the gas flow according to the temperature of such water so that the water may be brought to and maintained at the desired temperature. It will be understood that the form of the foregoing structure may be varied without departing from my invention.

As the hot gases from the burner 19 contact with the bottom 13 of the tank, the water in the tank at that point is initially and quickly heated and, as is well known, it rises toward the top of the tank. My invention provides for a thermosiphonic action within the storage tank to stimulate this initial heating and circulating action to insure the proper and rapid heating of the water and the maintaining of the same at the desired temperature, as follows: The flue 22 which leads from the combustion chamber 14 passes centrally through the storage tank. Obviously, some of the hot gases from the burner 19 are discharged directly into this flue and substantially all of the gases passing through this flue are hot gases. The heat from these gases is naturally given up through the flue walls to the water which may contact therewith and to utilize this heat for heating and circulating the water, I provide a multiple-tube riser or circulating element 23 mounted wholly within the storage tank 10. This element takes preferably the form shown in Fig. 2 and it extends from a point adjacent the tank bottom 13 to a point adjacent the top thereof. Specifically, this particular element 23 is star-shaped in cross-section and is of such size that it fits snugly around and against the flue 22 providing around such flue a series of equally spaced tubes 24 extending throughout the length of the element, such tubes being triangularly shaped in cross-section. I do not desire to be limited to the triangular form of the tubular parts 24, it being understood that these tube parts may take a semi-circular, or other shape in cross-section without departing from my invention. By mounting the element 23 upon the flue, as described, the cylindrical flue wall serves as a substantial part of the wall surface of each of the tubes 24 so that the heat transfer to the water in the tubes 24 is directly through the flue wall. The bottom of the element 23 is bell-shaped providing an upwardly-deflecting surface for positively directing the initially-heated and circulating water toward and into the riser tubes 24. It will be understood that, while I have utilized the heater flue 22 for supporting the riser element, yet any other suitable form of conduit may be employed (instead of or in addition to the heater flue) for that purpose.

In operation, the hot gases discharging from the burner 19 initially heat the water upon the bottom of the tank 13. This water as heated circulates upwardly and is directed by the riser-element mouth 23ª into the separated riser tubes 24. The heated gases just entering the flue 22 aid in this initial heating effect and tend to stimulate the initial circulatory action. As this initially heated water passes into the various riser tubes, heat is transferred thereto through the flue wall from the hot gases within the flue and the initial heating of the water is increased with consequent increase in circulation of the water. This circulatory action is further increased by the passage of the same through the relatively small-section riser tubes. Heat is transferred to this circulatory water as it continues to pass from the lowermost part of the tubes to the top thereof with consequent increase in circulation to the latter point with the total result that the circulatory action through the riser element is extremely rapid. This rapidity in circulation, as will be well understood, aids in the heat-transfer through the flue wall so that maximum efficiency in that regard is closely approached. Furthermore, this rapid circulation tends to prevent the formation of bubbles along the riser tube flue-wall surface, thereby practically eliminating a very undesirable insulating condition. Still further, this rapid circulatory action causes such a rapid movement of the water that objectionable lime deposits are not formed along the heat transfer surfaces which condition, if it existed, would greatly lower the heater efficiency due to the insulating effects.

Those skilled in the art will readily appreciate that by the elimination of the foregoing highly undesirable features the efficiency of the heater as a whole is greatly increased. In fact, with my invention, the heater efficiency closely approaches the ideal condition. Furthermore, in the use of my invention, the operating cost of the heater is greatly reduced. Less fuel is required because of the greater efficiency obtained from the fuel employed. The construction as a whole is exceedingly simple and quite inexpensive to manufacture. The automatic arrangement practically eliminates the human element and makes water heaters of this character foolproof and safe in operation. There are very few parts to maintain from repair and other standpoints. The parts used are of a character which may be readily and quickly cleaned and otherwise serviced.

While I have shown and described only one form of embodiment of my invention it will be understood that various changes in details and the arrangement of parts may be made therein without departing from the spirit and scope of my invention as defined by the claims which follow.

I claim:

1. In a water heater, a tank adapted to contain a body of water, a combustion chamber, a single flue leading from said combustion chamber and passing centrally through the water in said tank, a heating element in said combustion chamber and adapted to discharge hot gases directly against the bottom of said tank and into said flue, and a multiple-tube thermosiphonic water carrying element consisting of a plurality of separately-acting tubes mounted wholly within said tank and around and supported by said flue with the flue wall forming a part of the wall thereof for transfer of heat from the hot flue gases to the water in the tubes of such element directly through said flue wall.

2. In a water heater, a storage tank, means for discharging hot gases against the bottom of said tank, a conduit passing centrally from the tank bottom through the water in the tank and receiving hot gases from said means, a tubular member mounted upon the exterior of said conduit and extending from near the tank bottom to near its top, said tube being so shaped that it abuts the outer wall of said conduit at a plurality of points dividing the space around said conduit into a plurality of separate tubular passageways, and means common to all said passageways for insuring delivery of the water from the tank bottom toward and into said tubes.

3. In a water heater, a tank, a conduit passing through said tank, a hollow star-shaped water circulating element mounted upon and surrounding said conduit within said tank, the wall of said conduit forming with the star-arms of said element a plurality of triangularly-shaped, separated, water-circulating-passages along said conduit, and means for discharging hot gases against the wall of said tank at one end of said passages and into said conduit.

4. A thermo-siphonic device for heating and circulating water in a tank comprising a conduit member adapted to be mounted within the tank, and means associated with said conduit member for segregating the water in said tank immediately adjacent the wall of said conduit into an annular series of relatively thin, separated streams which engage and pass longitudinally along in immediate contact with the outer wall surface of said conduit, and means for passing a heating medium through said conduit.

5. In a water heater, a storage tank, a conduit passing through said tank, means for passing a heating medium through said conduit, a tubular member surrounding said conduit, said member terminating short of the top and bottom of said tank and having its wall extending inwardly at a plurality of points to contact the wall of said conduit and to provide a plurality of separate passages along said conduit and in communication with the water in said tank, said member including means for deflecting water from said tank into said separate passages.

6. In a water heater, a water storage tank, a cylindrical conduit passing through said tank, means for passing a heating medium through said conduit, a tubular member of star-like shape in cross section surrounding said conduit, said member terminating short of the top and bottom of said tank and due to its shape having its wall contacting the wall of said conduit at intervals to provide with the wall of said conduit a plurality of separate passages longitudinally along said conduit and in communication with said tank, said member having a flaring mouth of substantial size for insuring delivery of the water from said tank into said separate passages.

In testimony whereof, I have subscribed my name.

JAMES P. MORLEY.